United States Patent
Victory et al.

(10) Patent No.: US 10,285,384 B2
(45) Date of Patent: May 14, 2019

(54) BEE FRAME EXTRACTOR GRIP

(71) Applicant: LITTLE MULE BEE SUPPLY, LLC, Broken Arrow, OK (US)

(72) Inventors: Douglas Lee Victory, Terlton, OK (US); David John Mosinski, Broken Arrow, OK (US)

(73) Assignee: LITTLE MULE BEE SUPPLY, LLC, Broken Arrow, OK (US)

( * ) Notice: Subject to any disclaimer, the term of this patent is extended or adjusted under 35 U.S.C. 154(b) by 0 days.

(21) Appl. No.: 15/948,742

(22) Filed: Apr. 9, 2018

(65) Prior Publication Data

US 2018/0288978 A1    Oct. 11, 2018

Related U.S. Application Data

(60) Provisional application No. 62/483,439, filed on Apr. 9, 2017.

(51) Int. Cl.
| | |
|---|---|
| *A01K 55/00* | (2006.01) |
| *B25B 7/14* | (2006.01) |
| *B25B 5/06* | (2006.01) |
| *B25B 5/12* | (2006.01) |
| *B25B 5/16* | (2006.01) |

(52) U.S. Cl.
CPC .............. *A01K 55/00* (2013.01); *B25B 5/06* (2013.01); *B25B 5/12* (2013.01); *B25B 5/166* (2013.01); *B25B 7/14* (2013.01)

(58) Field of Classification Search
CPC .................................. A01K 55/00; B25B 7/14
USPC ......................................... 294/118, 81.61, 28
See application file for complete search history.

(56) References Cited

U.S. PATENT DOCUMENTS

| | | | | |
|---|---|---|---|---|
| 1,553,734 | A * | 9/1925 | Wilson .................... | A01K 55/00 294/118 |
| 1,569,405 | A * | 1/1926 | Sommer .................. | A47J 45/10 294/145 |
| 1,775,309 | A * | 9/1930 | Culp ........................ | A47J 45/10 294/145 |
| 1,974,255 | A * | 9/1934 | Behrendt ............... | B65D 71/50 294/118 |
| 2,016,356 | A * | 10/1935 | Alberg .................... | F24B 15/10 294/118 |
| 2,029,809 | A * | 2/1936 | Connolly ................. | A45F 5/10 294/28 |
| 2,251,529 | A * | 8/1941 | Sterling ................. | A01K 55/00 294/118 |
| 2,747,917 | A * | 5/1956 | Smith ..................... | A01G 21/00 294/116 |
| 2,997,326 | A * | 8/1961 | Daum ..................... | A01K 55/00 294/106 |

(Continued)

*Primary Examiner* — Paul T Chin
(74) *Attorney, Agent, or Firm* — Martin S. High, P.C.; Martin S. High

(57) ABSTRACT

Bee keepers, or apiarists, need to regularly inspect their hives in an apiary. In addition, the goal of the apiary is to collect products from the hive. To perform these maintenances chores, the bee keeper typically is required to remove a frame from the hive. Embodiments of the Bee Frame Extractor Grip are comprised of a pair of handles, a left-side grip assembly, and a right-side grip assembly. The pair of handles connect the left-side grip assembly and the right-side grip assembly via bolts that pass through the upper arms of both L-brackets and into the ends of the handles.

6 Claims, 8 Drawing Sheets

(56) References Cited

U.S. PATENT DOCUMENTS

| | | | | |
|---|---|---|---|---|
| 3,269,764 A | * | 8/1966 | Coleman | B65G 7/12 294/106 |
| 3,301,585 A | * | 1/1967 | Johnson | B65G 7/12 294/118 |
| 4,109,952 A | * | 8/1978 | Monzain | B65G 7/12 294/118 |
| 4,527,823 A | * | 7/1985 | Straus | B65G 7/12 294/118 |
| 8,348,317 B1 | * | 1/2013 | Bird | A45F 5/00 248/75 |
| 9,630,778 B1 | * | 4/2017 | Coates | B65G 7/12 |

* cited by examiner

BEE FRAME EXTRACTOR GRIP

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE EMBODIMENTS

Field of the Embodiments

The general field of the embodiments of the Bee Frame Extractor Grip is bee keeping More specifically the field of the embodiments relates to devices to remove bee frames from vertical stackable frame hives. Each bee frame hive referred to as a "super" consists of 10 frames. There are a variety of bee frame sizes in wood and plastic design. The Bee Frame Extractor Grip will work equally well on standard sizes

Description of Prior Art

Bee keepers, or apiarists, need to regularly inspect their hives in an apiary. In addition, the goal of the apiary is to collect products from the hive including honey, beeswax, propolis, pollen, and royal jelly. To perform these maintenances chores, the bee keeper typically is required to remove a frame from the hive. The prior art used consist of pliers, hooks, grips, and other devices used to grab the top of a bee frame to pull the frame from the hive. One difficulty with the prior art devices is that it takes significant strength of the arms and hands to grip the frame to remove it from the hive. One purpose of the embodiments described herein is to reduce the strength requirement for removing a frame. This is particularly important since over the course of an apiarist's day, many frames need to be removed resulting in significant strain in the hands and arms of the apiarist as the frames can weigh 10 to 15 pounds due to number of bees, honey and comb.

In the past, bee frames have been constructed from wood. More recently, plastic bee frames have been introduced which have a different shape than the earlier wood frames. These different frames made existing methods of removing frames incompatible with both wood and plastic frames. Further, due to the weight of the comb existing methods of lose grip of the frame if the frame is held horizontally. Some bee keepers prefer wood and others plastic frames while many with mixed material in the same hive. Due to construction using wood or plastic shapes, no tool, plier, or device exists to accommodate each configuration. These size variations cause more hand and arm strain of the apiarist and twisting while examining. When this occurs, a frame could easily fall damaging the comb or killing bees including the queen.

SUMMARY OF THE EMBODIMENTS

Embodiments of the Bee Frame Extractor Grip are comprised of a pair of handles, a left-side grip assembly, and a right-side grip assembly. The pair of handles connects the left-side grip assembly and the right-side grip assembly via bolts that pass through the upper arms of both L-brackets and into the ends of the handles. The Bee Frame Extractor Grip is specially orientated to fit wood and plastic frames from all manufacturers. The Bee Frame Extractor Grip unit uses a double mechanical design which greatly reduces hand force to close and hold closed.

There has thus been outlined, rather broadly, the more important features of the embodiments in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be used as a basis for the designing of other structures, methods and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application which is measured by the claims, nor is it intended to be limiting as to the scope of the embodiments in any way.

DETAILED DESCRIPTION OF THE PREFERRED EMBODIMENTS

Figure 1:
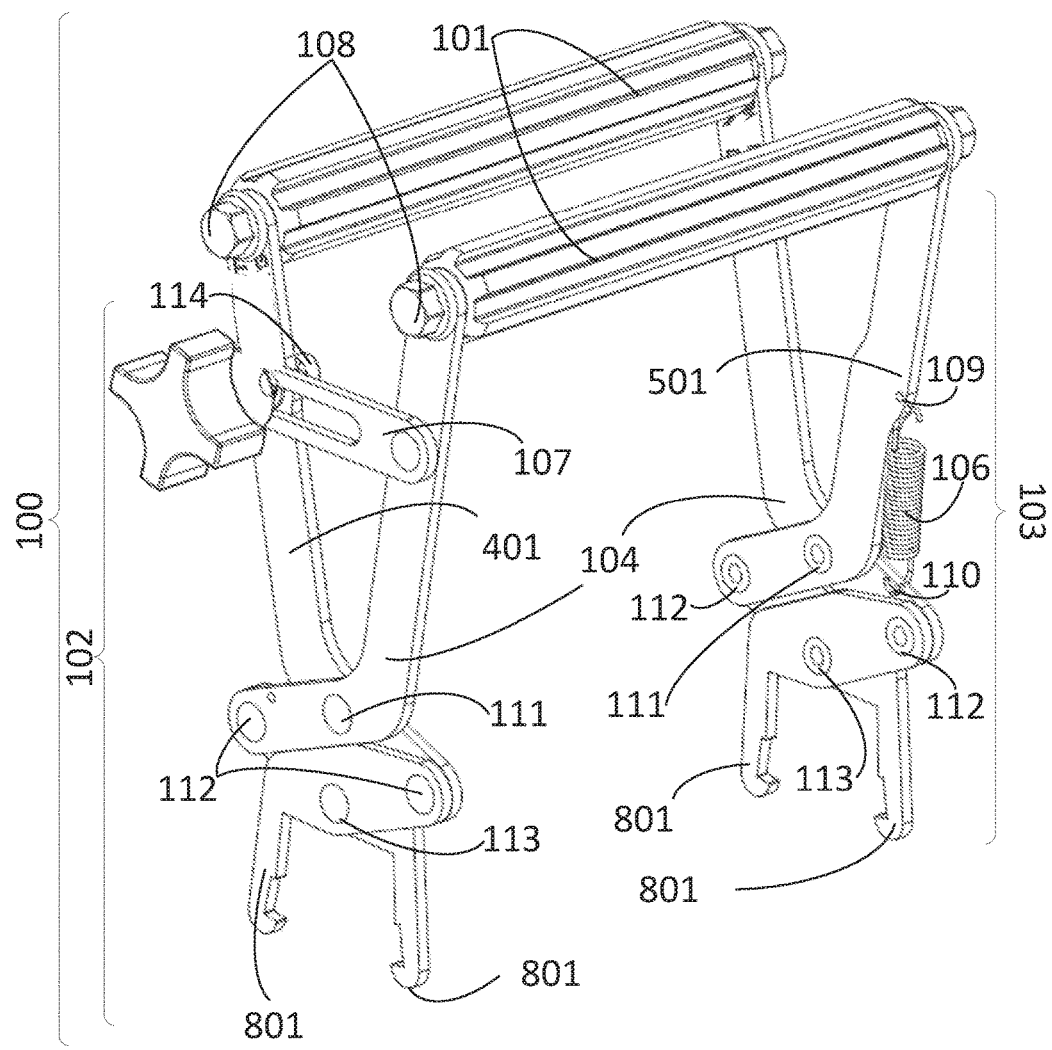
FIG. 1 is a perspective view of an embodiment of the Bee Frame Extractor Grip.
Figure 2A:
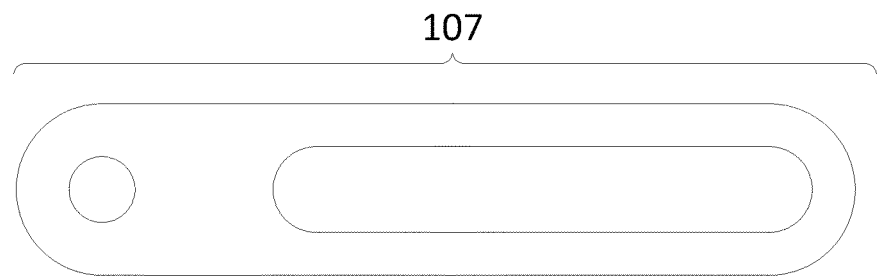
FIG. 2A is a side view of an embodiment of a lock bar.
Figure 2B:
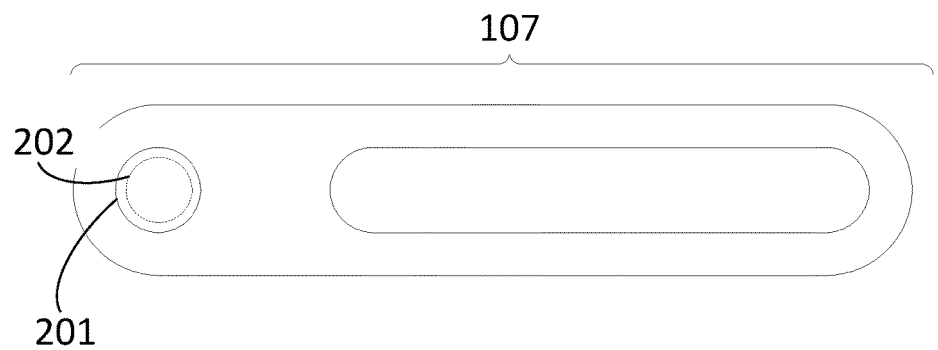
FIG. 2B is a side view of an embodiment of a lock bar showing the optional visual/position indicator.
Figure 3:
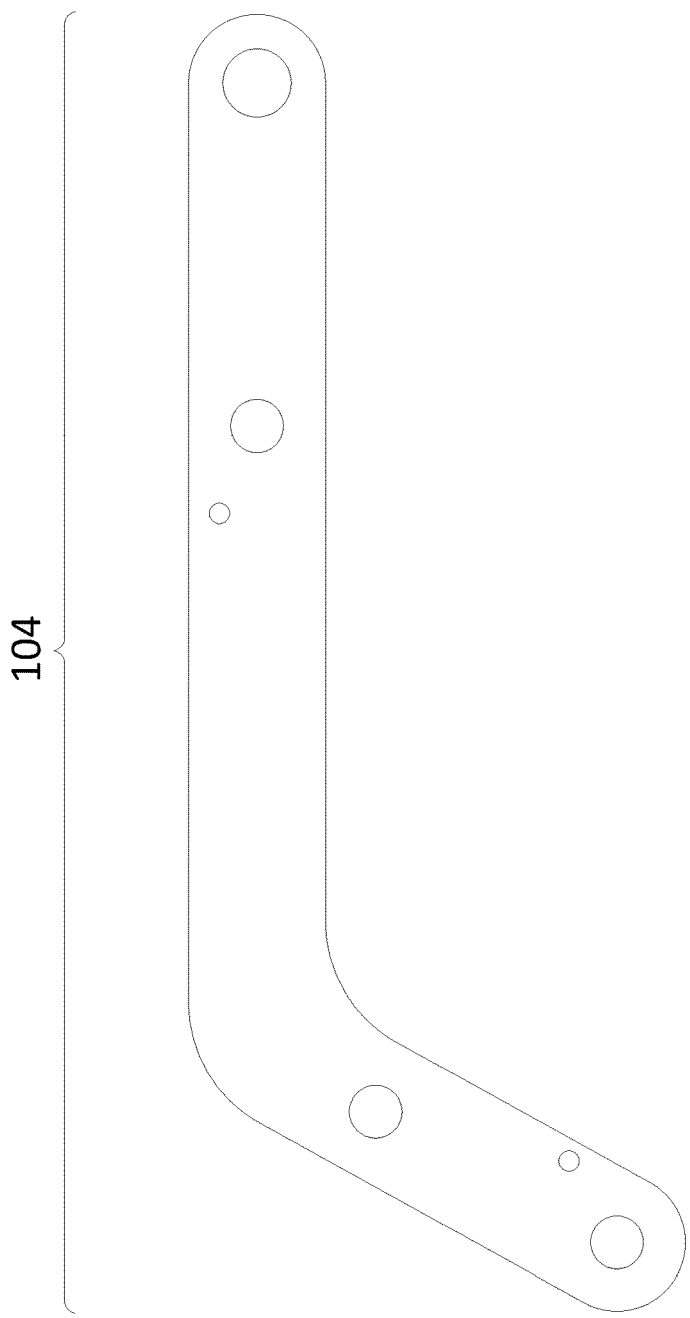
FIG. 3 is a side view of an embodiment of an L-bracket.
Figure 4:
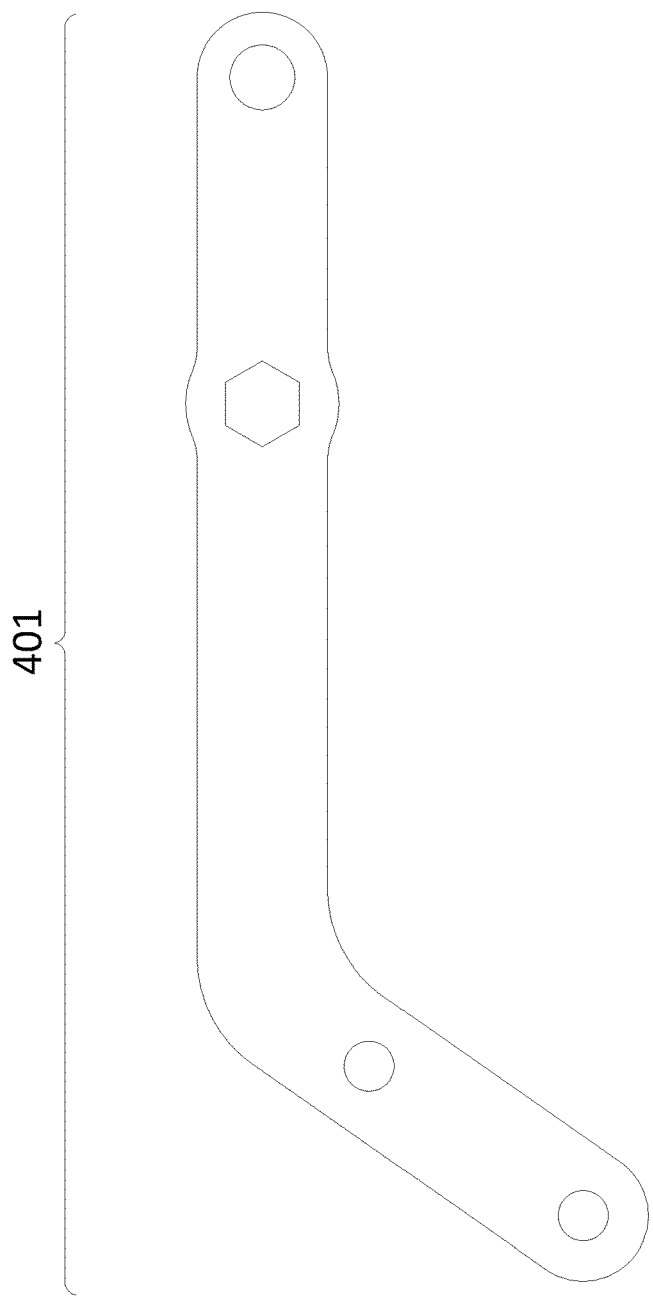
FIG. 4 is a side view of an embodiment of a lock-bolt L-bracket.
Figure 5:
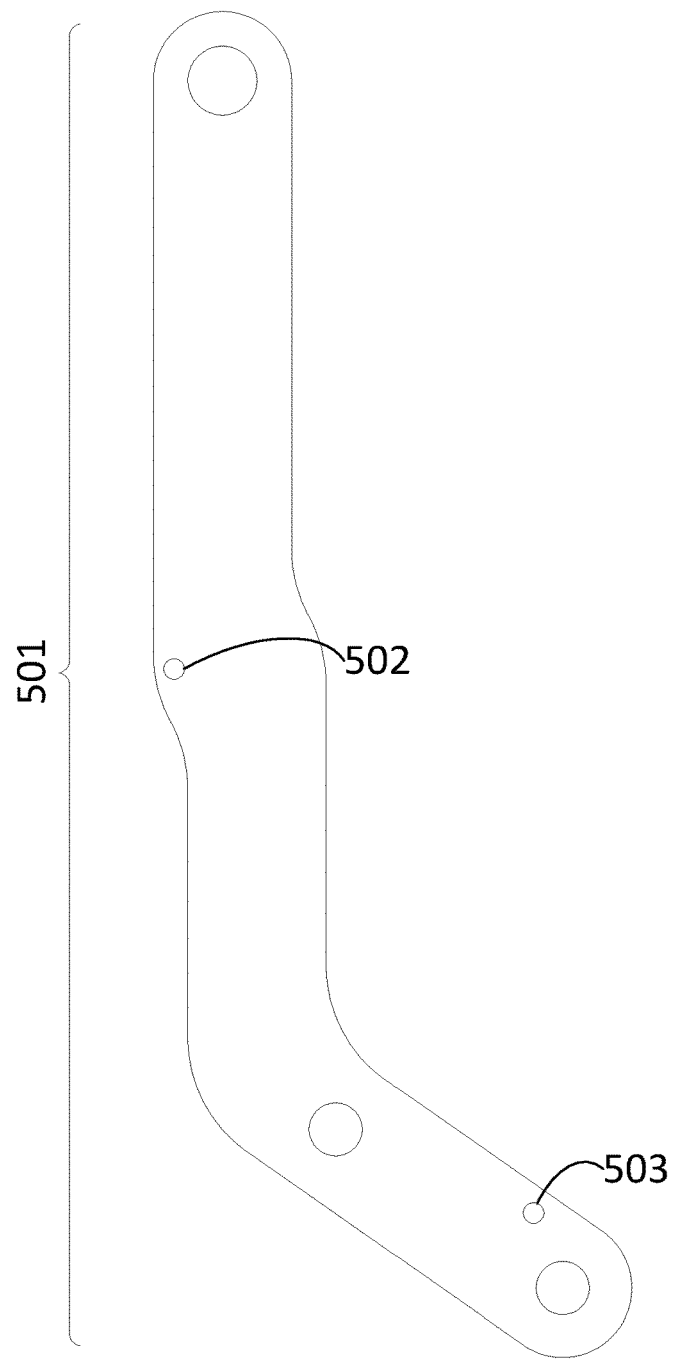
FIG. 5 is a side view of an embodiment of an off-set L-bracket.
Figure 6:
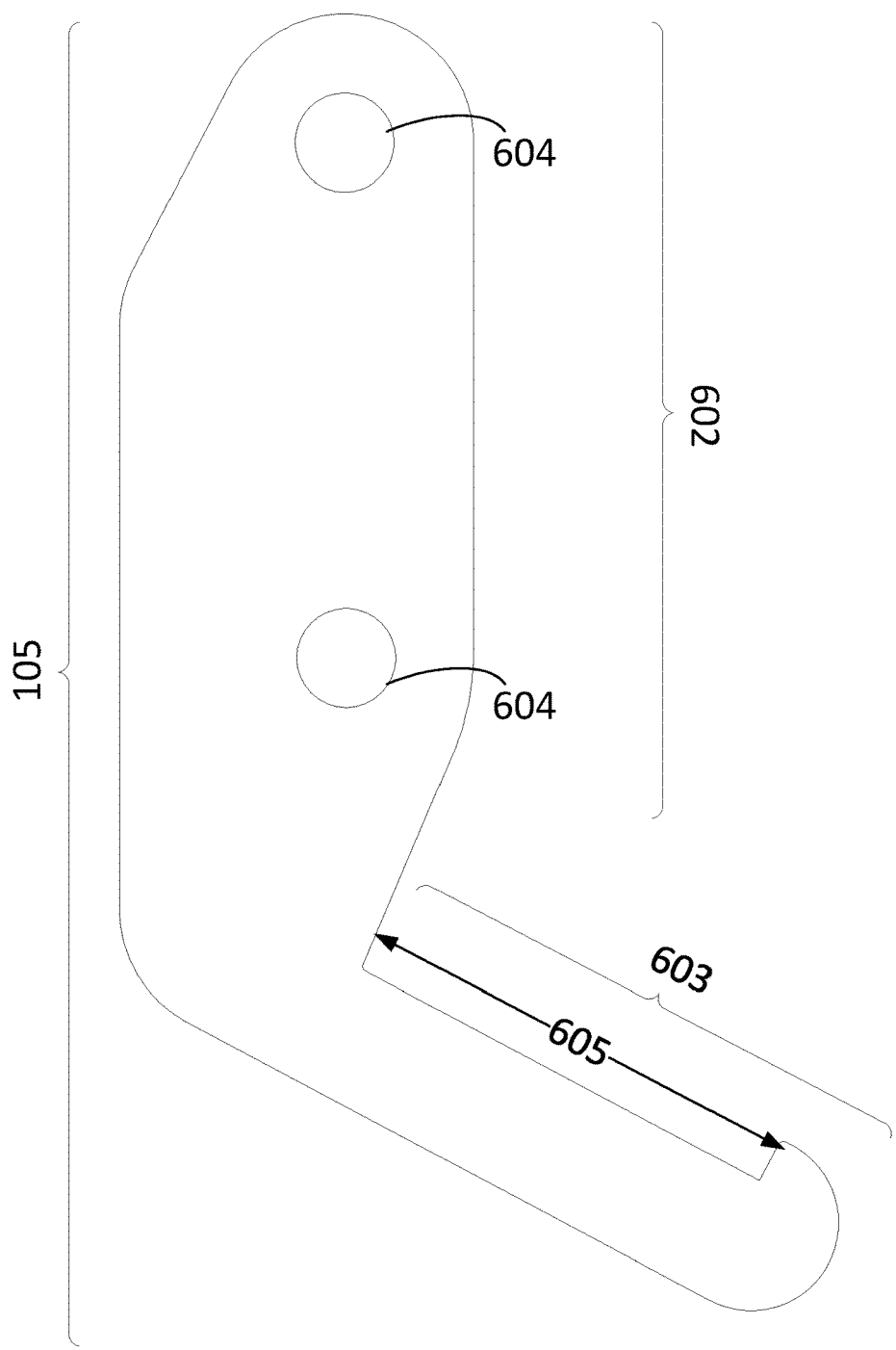
FIG. 6 is a side view of a wood frame grip.
Figure 7:
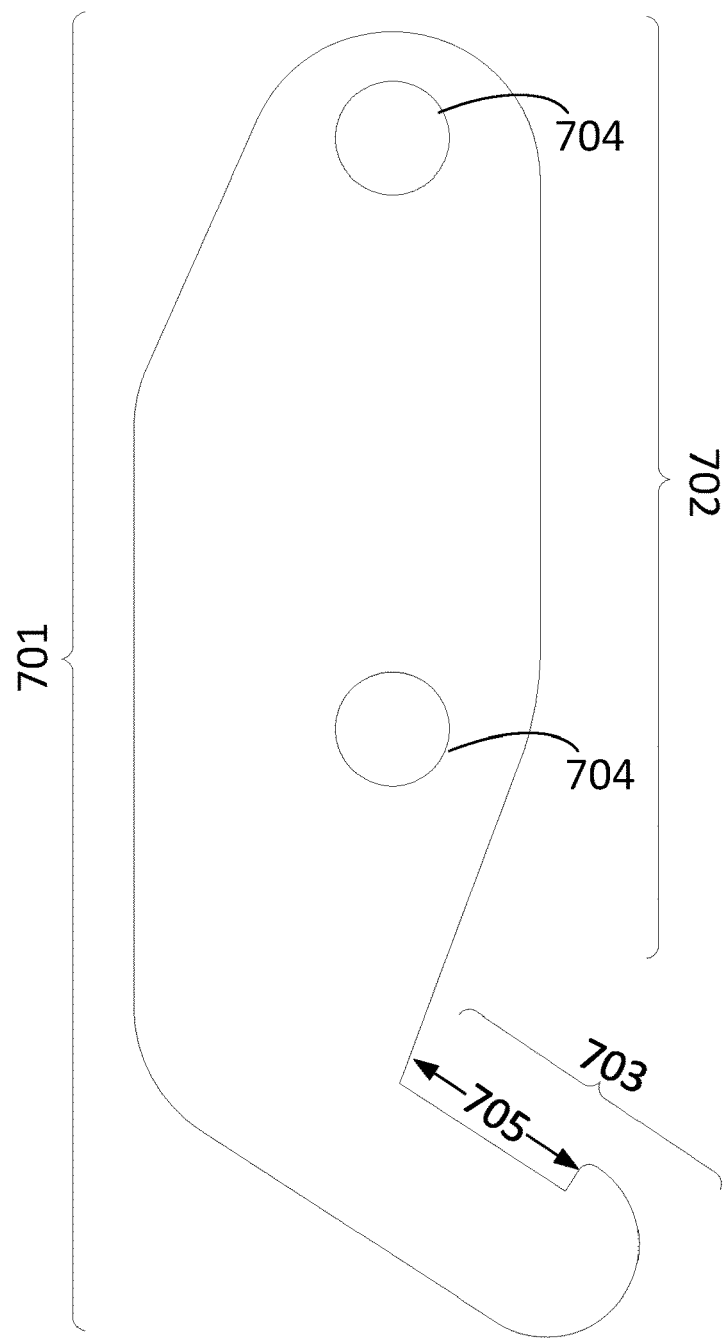
FIG. 7 is a side view of a plastic frame grip.
Figure 8:
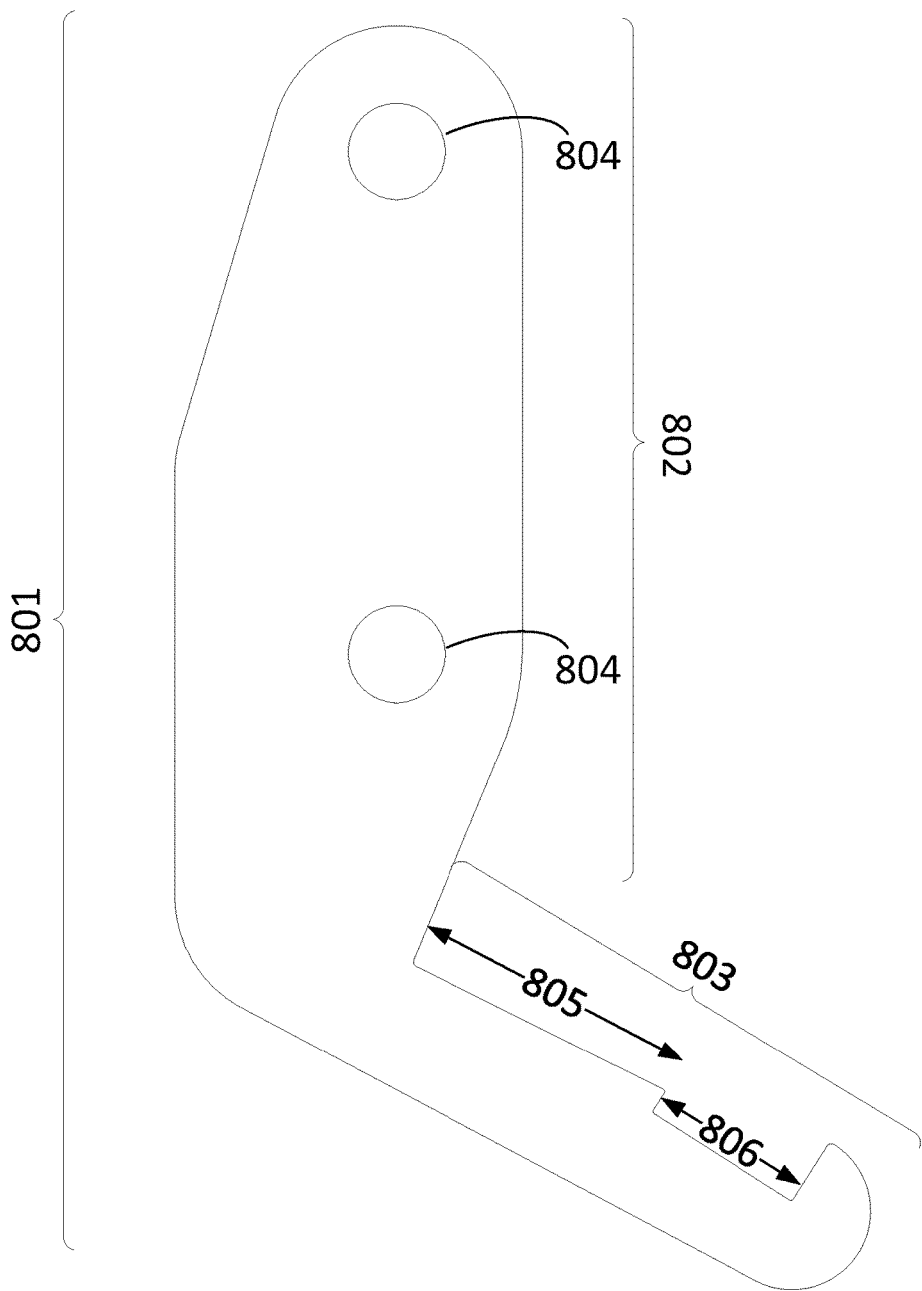
FIG. 8 is a side view of a universal grip.

Embodiments of the Bee Frame Extractor Grip are comprised of a Bee Frame Extractor Grip 100 comprising a pair of handles 101, a left-side grip assembly 102, and a right-side grip assembly 103. The pair of handles 101 connect the left-side grip assembly 102 and the right-side grip assembly 103 via bolts 108 that pass through the upper arms of both L-brackets 104 and into the ends of the handles.

The left-side grip assembly 102 is comprised of two L-brackets 104 and two scissor grips that are wood frame scissor grips (105), plastic frame scissor grips 701, or universal frame scissor grips 801.

The right-side grip assembly 103 is comprised of two L-brackets 104 and two scissor grips 105, and a spring 106. The spring is attached to one of upper arms of the L-brackets 104 via an upper aperture 109 formed by the L-bracket and connected to a lower arm of the other L-bracket via a lower aperture 110 formed by that L-bracket.

The pair of handles 101 connect the left-side grip assembly 102 and the right-side grip assembly 103 via bolts 108 that pass through the upper arms of all the L-brackets 104 and into the ends of the handles 101 securing the handles 101 to the L-brackets 104. The L-brackets 104 within the left-side grip assembly 102 are connected together via a L-bracket pivot 111. The L-brackets 104 within the right-side grip assembly 103 are connected together in the same manner via a L-bracket pivot 111. The L-brackets 104 within the left-side grip assembly 102 are connected to the pair of scissor grips 105 via a pair of scissor pivots 112. The scissor grips 105 are connected to each other via a center scissors pivot 113. The L-brackets 104 within the right-side grip assembly 103 are connected in the same matter as the left-side grip assembly 102. The pair of scissor grips 105 are connected to the L-brackets 104 via a pair of L-bracket-scissor pivots 112. The scissor grips 105 are connected to each other via a center scissors pivot 113. In one embodiment, the L-bracket pivots 111, the L-bracket-scissor pivots 112, and the center scissors pivots 113 are 0.188 diameter 11/32 inch long stainless steel truss head rivets.

A lock bar 107 and a lock bolt 114 are used to secure the scissor grips 105 into the position to grip the bee frame so that the user does not have to exert force on the handles 101 to remove the bee frame. The lock bar 107 is connected to the right-side grip assembly 103. To engage the lock, the apiarist tightens the lock bolt 114 and to releases the lock the apiarist loosens the lock bolt 114. The lock bar serves to release the apiarist's grip on the frame while inspecting. The lock bar does not need to be engaged and most likely not to remove the frame. The lock bar is designed to accommodate all widths of frames with its sliding groove. The grip is designed to close around the frame easily with little force. It is this action one normally takes to maneuver and lift the frame as the apiarist removes a frame. The locking arm further allows the bee keeper to maneuver the frame or even set it down to perform other tasks without removing the frame grip.

In another embodiment, the left-side grip assembly 102 is comprised of one L-bracket 104 and one lock-bolt L-bracket 401. The right-side grip assembly 103 is comprised of one L-brackets 104 and one lock-bolt L-bracket 401, and a spring 106. The spring is attached to one of upper arms of the L-brackets 104 via an upper aperture 109 formed by the L-bracket and connected to a lower arm of the other L-bracket via a lower aperture 110 formed by that L-bracket.

In another embodiment, the left-side grip assembly 102 is comprised of one off-set L-bracket 501 and one lock-bolt L-bracket 401. The right-side grip assembly 103 is comprised of one off-set L-bracket 501, one lock-bolt L-bracket 401, and a spring 106. The spring is attached to one of upper arms of the off-set L-bracket 501 via an off-set upper aperture 502 formed by the L-bracket and connected to a lower arm of the off-set L-bracket 501 via an off-set lower aperture 503 formed by that off-set L-bracket 501.

In another embodiment, the scissor grips 105 are replaced with plastic frame scissor grips 701 or are replaced with universal scissor grips 801. The and two scissor grips 105 are designed to be used for traditional wooden bee frames. In another embodiment, the scissor grips 105 are replaced with plastic frame scissor grips 701 or are replaced with universal scissor grips 801.

The scissor grips 105 are comprised of a pivot section 602 and a grip section 603. The pivot section form pivot apertures 604 which allow the scissor pivots 112 and center scissors pivot 113 to pass. The grip section is comprised of a grip gap 605 of between 0.75 and 1.00 inch with one embodiment comprised of a plastic frame grip gap 605 of approximately 0.875 inch.

The plastic frame scissor grips 701 are comprised of a pivot section 702 and a plastic frame grip section 703. The pivot section form pivot apertures 704 which allow the scissor pivots 112 and center scissors pivot 113 to pass. The grip section is comprised of a plastic frame grip gap 705 of between 0.25 and 0.50 inch with one embodiment comprised of a plastic frame grip gap 705 of approximately 0.335 inch.

The universal scissor grips 801 are comprised of a pivot section 802 and a grip section 803. The pivot section form pivot apertures 804 which allow the scissor pivots 112 and center scissors pivot 113 to pass. The grip section is comprised of a universal wood grip gap 805 of between 0.375 inch and 0.875 inch and a universal plastic grip gap 806 of between 0.25 and 0.45 inches. In one embodiment the wood grip gap 805 is approximately 0.545 inch and the universal plastic grip gap 806 is approximately 0.33 inch.

The optional positioning/indicator guide 201 is used to assist a bee keeper to return a frame back into the super in the same direction it was removed. When the lock bolt 114 is not used with the lock bar 107, the positioning/indicator guide 201 is affixed over the aperture 202 through which the lock bolt 114 would normally pass. Bees do not build comb evenly on a frame. One side may have much more or less comb on a side. This positioning guide assists when returning the frame back into the hive the orientation is the same when it was extracted. Without it the bee keeper might return the frame 180 degrees and the comb would scrape against another frame in the hive. This not only damages the comb but could kill bees including the queen. If this happens bees become agitated and could swarm.

To remove a bee frame, the user grasps the Bee Frame Extractor Grip 100 by the handles 101. The spring forces the scissor grips apart leaving it in a normal open position. The user puts the frame grip over the top of the frame and pushes the handles 101 towards each other. The pair of scissor grips 105 closes allowing the Bee Frame Extractor Grip 100 to grasp the bee frame. The user then lifts the frame out to inspect. When done the user then releases the handles and the spring forces the handles and scissor grips 105 to move away from each other and releases the grip on the frame.

There are various types of apiarist handling large medium and small number of hives from pollinating crops, raising queen bees, honey, and many other products. More people are hobbyist bee keepers ranging from young children, women and seniors or those with disabilities. The handles are ¾ inch in diameter to accommodate large and small hands. The hand grips on the handles are fluted to prevent slipping even with heavy gloves. The operating distance for the handles from fully open to the grips closed around frame is approximately 1 inch on the universal and wood grips and approximately 1.25 inch on plastic grips. Due to the width of the scissors and spacing held within its design by limiting the frame extractor to open larger, the grip can be placed directly between bee frames without manipulation.

What is claimed is:

1. A bee frame extractor grip comprising
   a pair of handles;
   a left-side grip assembly; and
   a right-side grip assembly;
   wherein the left-side grip assembly is comprised of
   two L-brackets or one L-bracket and one lock-bolt L-bracket;
   two wood frame scissor grips, two plastic frame scissor grips, or two universal frame scissor grips;
   an optional lock bar; and
   an optional lock bolt;
   wherein the pair of handles connect the left-side grip assembly and the right-side grip assembly via bolts that pass through upper arms of the L-brackets and into the ends of the handles securing the handles to the L-brackets;
   wherein the pair of scissor grips are connected to the L-brackets via a pair of L-bracket-scissor pivots;
   wherein the two L-brackets or one L-bracket and one lock-bolt L-bracket are connected to the pair of scissor grips via a pair of scissor pivots; and
   wherein the scissor grips are connected to each other via a center scissors pivot.

2. The bee frame extractor grip in claim 1 wherein the left-side grip assembly is comprised of
   a lock bar; and
   a lock bolt.

3. The bee frame extractor grip in claim 2 where the right-side grip assembly is comprised of
   two L-brackets or one L-bracket and one off-set L-bracket; and
   two wood frame scissor grips, two plastic frame scissor grips, or two universal frame scissor grips, a spring;
   wherein the L-bracket pivots, the L-bracket-scissor pivots, and the center scissors pivots are stainless steel truss head rivets.

4. The bee frame extractor grip in claim 3 wherein the right-side grip assembly is comprised of one L-brackets and one lock-bolt L-bracket and the spring is attached to one of upper arms of the L-brackets via an upper aperture formed by the L-bracket and connected to a lower arm of the other L-bracket via a lower aperture formed by that L-bracket.

5. The bee frame extractor grip in claim 2 wherein the left-side grip assembly is comprised of one L-bracket and one lock-bolt L-bracket.

6. The bee frame extractor grip in claim 2 wherein the right-side grip assembly is comprised of one L-bracket, and one off-set L-bracket.

* * * * *